United States Patent [19]

Repella

[11] Patent Number: 4,554,723
[45] Date of Patent: Nov. 26, 1985

[54] TRANSFER APPARATUS AND METHOD
[75] Inventor: James A. Repella, Berkley, Mich.
[73] Assignee: Microdot Inc., Darien, Conn.
[21] Appl. No.: 634,825
[22] Filed: Jul. 26, 1984
[51] Int. Cl.⁴ .................... B21D 39/03; B23P 21/00; B23Q 15/00; B65G 43/10
[52] U.S. Cl. .................... 29/430; 29/33 J; 29/33 K; 29/709; 29/822; 198/339.1; 198/343; 198/575; 198/577; 414/224
[58] Field of Search ............... 29/33 J, 33 K, 33 P, 29/430, 559, 700, 709, 711, 791, 792, 822, 823, 824, 712; 198/339, 343, 575, 577; 414/224, 225

[56] References Cited
U.S. PATENT DOCUMENTS

| 3,688,965 | 9/1972 | Kellner et al. | 29/430 X |
| 3,851,384 | 12/1974 | Kellner et al. | 29/430 |
| 3,986,247 | 10/1976 | Kellner et al. | 29/430 |
| 4,464,833 | 8/1984 | Duncan | 29/709 |

Primary Examiner—Howard N. Goldberg
Assistant Examiner—Ronald S. Wallace
Attorney, Agent, or Firm—Lyman R. Lyon

[57] ABSTRACT

A method and apparatus for transferring workpieces to successive work devices. The apparatus comprises concentric turntables mounted for rotation about a common central axis. A series of work devices are mounted on the inner turntable and a series of workpiece holder devices are mounted on the outer turntable. The turntables are rotated in the same direction and in synchronism while the various work devices respectively perform work operations on the various workpieces held in the various workpiece holder devices, whereafter the inner turntable is accelerated and the outer turntable is decelerated until the various workpieces reach a position midway between successive work devices, whereafter the inner turntable is decelerated and the outer turntable is accelerated until the workpieces arrive at positions of alignment with the next successive work devices.

27 Claims, 8 Drawing Figures

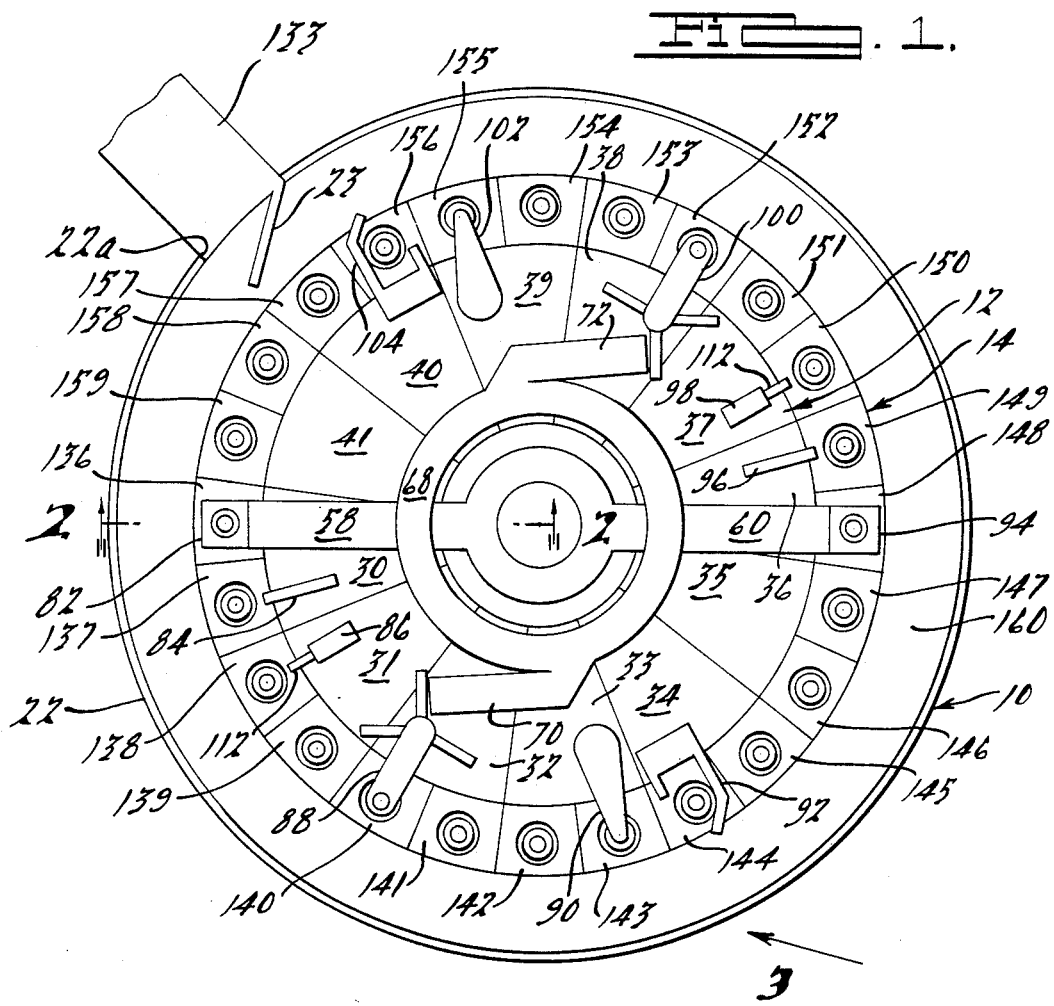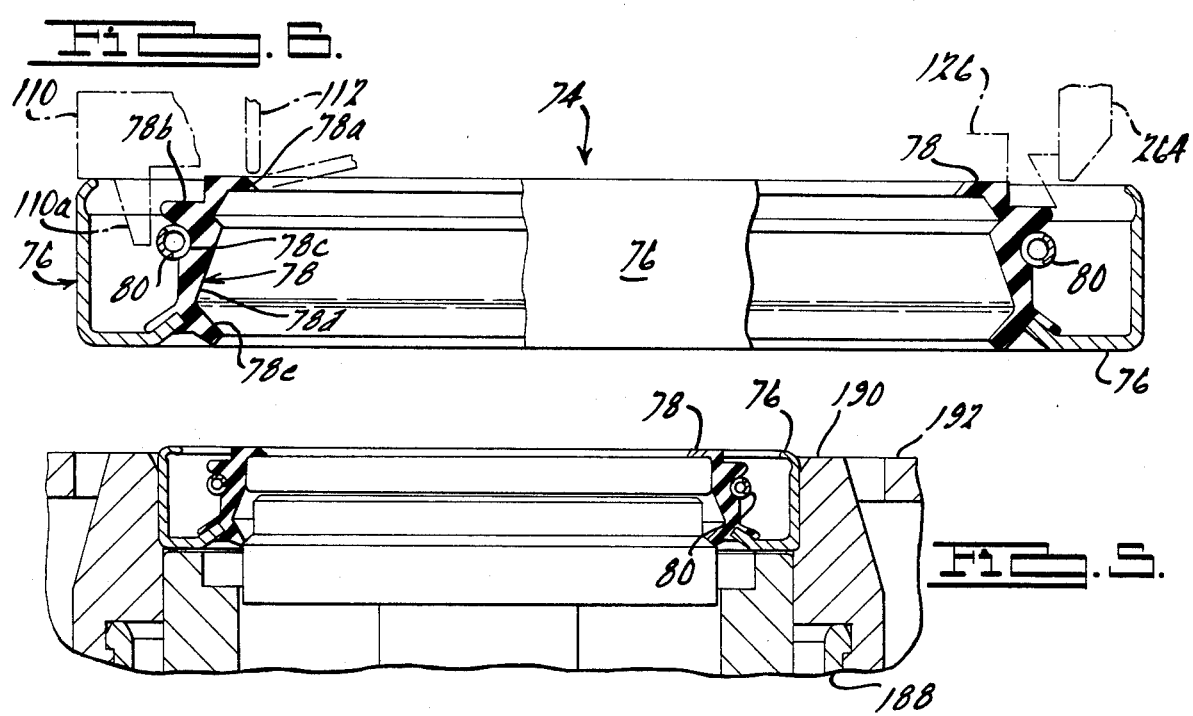

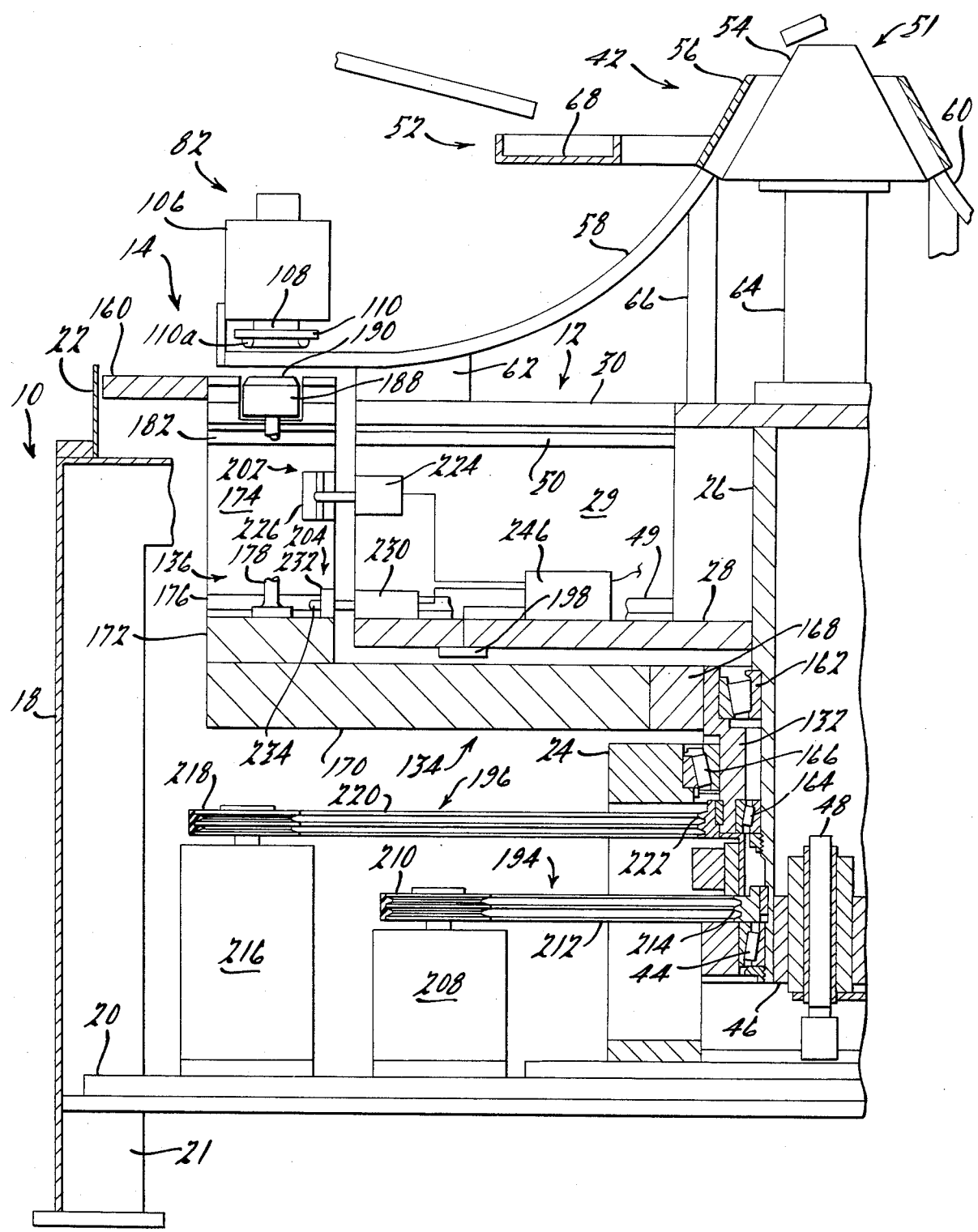

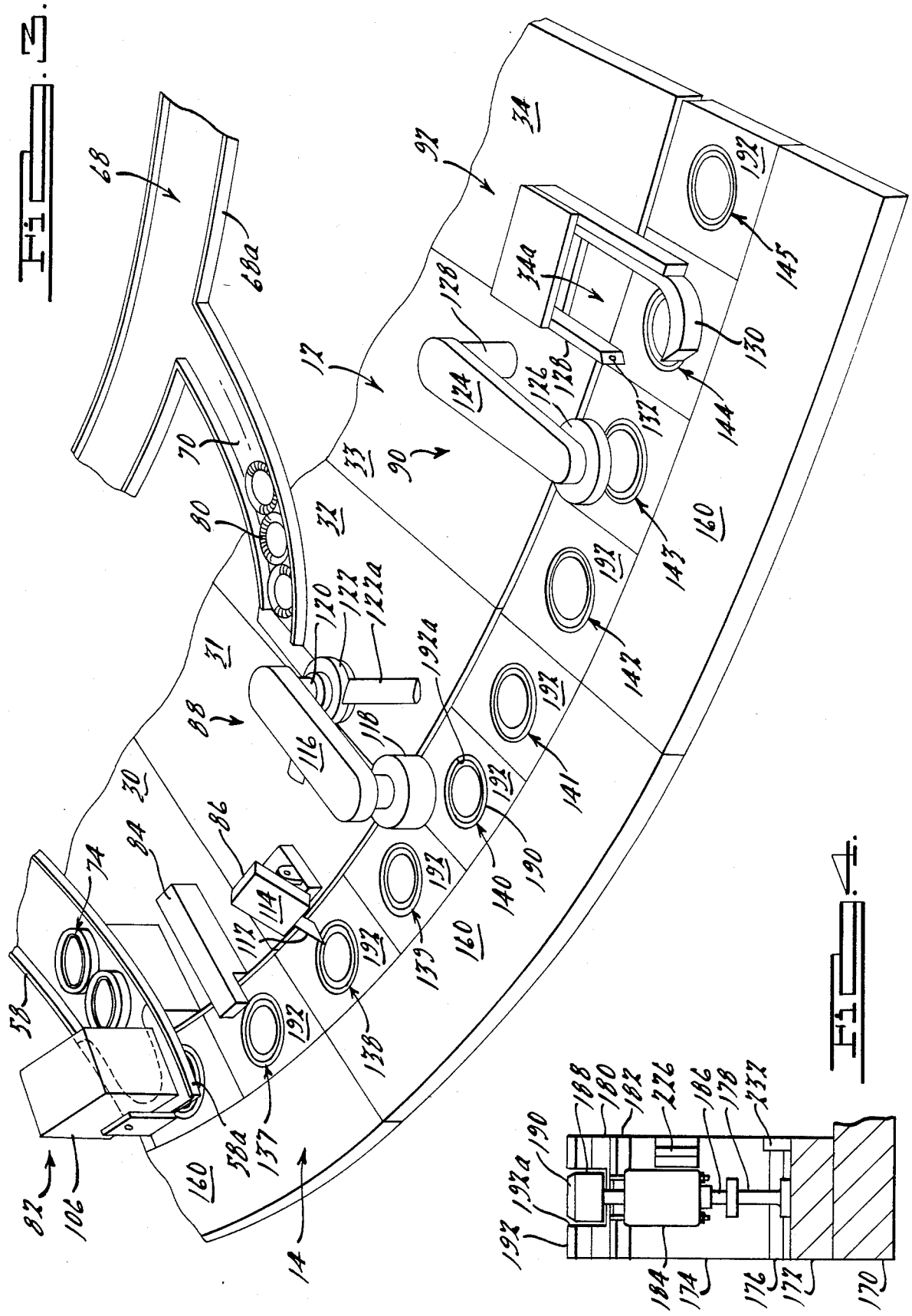

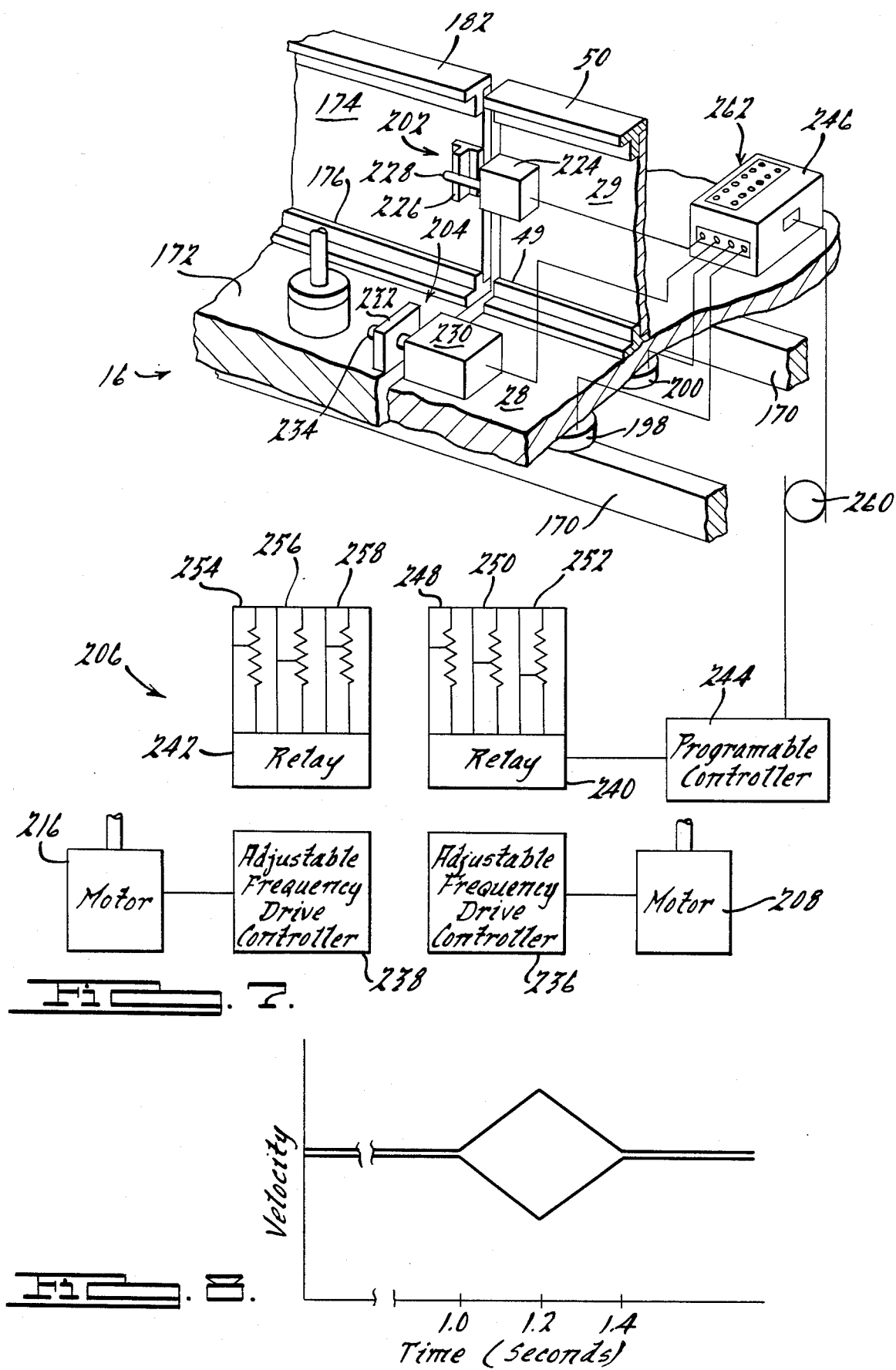

TRANSFER APPARATUS AND METHOD

BACKGROUND OF THE INVENTION

This invention relates to apparatus and methods for moving workpieces through successive work stations for successive work operations.

A myriad of devices and methods have been proposed for transferring workpieces from one work station to the next in order to facilitate successive work or assembly operations on the workpiece. Such transfer devices and methods must operate to quickly and positively move the workpieces between work stations. In a typical multi-station work process, the time required to perform each work or assembly operation at each work station is largely a given that cannot be significantly reduced. If any reductions are to be achieved in the total time required to perform the total multi-station work process, that reduction must be accomplished by a reduction in the time required to transfer the workpieces between stations. And yet any increase in the speed at which the workpiece transfer is achieved must not be at the expense of any derogation in the quality of the overall work process. Specifically, any speedup in transfer time must not increase scrappage and must not detract in any way from the ability of the individual work devices at the individual work stations to efficiently perform their specific work or assembly operations.

SUMMARY OF THE INVENTION

The object of the present invention is to provide a transfer apparatus and method, for use in a multi-station work process, which reduces the time required to effect a transfer of the workpiece between successive work devices positioned at successive work stations and which achieves such reduction without derogation of the total work process.

According to the invention, the successive work devices are mounted in series on a first carrier member; the workpiece is mounted on a second carrier member; the carrier members are moved in a given direction and at a given synchronous rate of speed along parallel paths and the relative speed of the carrier members is selectively varied to advance the workpiece successively through the work stations for successive work operations by the work devices.

According to a further feature of the invention, each advance of a workpiece from one work station to the next work station is accomplished by accelerating one of the carrier members while decelerating the other carrier member until the workpiece is at a predetermined position intermediate the previous work station and a new work station; thereafter decelerating the one carrier member while accelerating the other carrier member so that the carrier members reassume their synchronous speed as the workpiece arrives at the new work station; and thereafter maintaining both of the carriers at the synchronous speed until the operation to be performed on the workpiece by the work device position at the new work station has been completed.

In the disclosed embodiment of the invention, the predetermined intermediate position of the workpiece is halfway between the previous work station and the new work station, and the acceleration curve of each carrier member is generally symmetrical to the deceleration curve of that member so that each carrier member returns to the given synchronous rate of speed as the workpiece arrives at the new work station.

The invention apparatus for carrying out the invention process comprises first and second concentric turntables mounted for rotation about a common central axis and control means for selectively varying the rotational speeds of the turntables so that a workpiece carried on one of the turntables may be successively delivered to successive work devices carried by the other turntable. In the disclosed embodiment, the outer turntable carries the workpieces and the work devices are carried on the inner turntable.

BRIEF DESCRIPTION OF THE DRAWINGS

FIG. 1 is a plan view of a transfer apparatus according to the invention;

FIG. 2 is a cross-sectional view, taken on line 2—2 of FIG. 1;

FIG. 3 is a fragmentary perspective view looking in the direction of the arrow 3 in FIG. 1;

FIG. 4 is a fragmentary, somewhat schematic view of a workpiece holder for use in the invention transfer apparatus;

FIG. 5 is a fragmentary detail view of the upper end of the workpiece holder of FIG. 4;

FIG. 6 is a view of an annular seal comprising the workpiece for which the disclosed embodiment of the invention has been designed;

FIG. 7 is a schematic view showing a control mechanism for the invention transfer apparatus, and FIG. 8 is a graph showing certain time/velocity aspects of the invention transfer apparatus.

DETAILED DESCRIPTION OF THE PREFERRED EMBODIMENT OF THE INVENTION

The invention transfer apparatus, broadly considered, includes a frame structure 10, an inner carrier member or turntable assembly 12, an outer carrier member or turntable assembly 14, and a control assembly 16.

Frame assembly 10 includes an outer annular skirt 18, a base plate 20, a plurality of feet 21, an annular skirt or wall 22 positioned at the upper end of skirt 18 and a fixed deflector member 23 secured to skirt 22 at an opening 22a in the skirt. A bearing support structure 24 upstands centrally from base plate 20.

Inner turntable assembly 12 includes a central hollow post 26, a support platform structure 28, a plurality of bulkheads 29, a plurality of modular work station plates 30–41, and a supply structure 42.

Post 26 is suitably journaled in bearing support structure 24 as, for example, by an outer bearing 44 encircling the lower end of the post and an inner bearing 46 interposed between the inner periphery of the lower end of the post and a central pilot shaft 48 upstanding from bearing support structure 24. Support platform structure 28 is annular and is suitably secured to post 26 adjacent the upper end of the post. Bulkheads 29 extend radially outwardly from the central axis of the apparatus and are supported in a circumferential array on platform structure 28 by a plurality of T-section bracket members 49 suitably to secured to platform structure 28.

Modular work station plates 30–41 are segmental or pie-shaped and are supported in a circumferential array around the central axis of the apparatus on T-section bracket members 50 suitably secured to the upper edge of bulkheads 29. In the disclosed embodiment, twelve bulkheads 29 are employed and twelve modular work station plates are positioned on top of the bulkheads so that the bulkheads are 30° apart and each modular plate has a radial extent of 30°.

Supply structure 42 includes a workpiece delivery structure 51 and an auxiliary part delivery structure 52.

Workpiece delivery structure 51 includes an inner truncated cone 54, an outer truncated cone 56, and a pair of workpiece delivery chutes 58, 60. Each delivery chute 58, 60 communicates at its upper end with the lower end of the annular conical space defined between cones 54 and 56 and is supported at its lower end by a suitable bracket 62 mounted on the underlying work station module 30, 36. A central upstanding post 64 and a plurality of circumferentially spaced legs 66 support workpiece delivery structure 51 on inner turntable assembly 12 for rotation with that turntable.

Auxiliary part delivery structure 52 comprises an annular horizontal tray 68 encircling workpiece delivery structure 51 and suitably supported on inner turntable 12 for rotation with that turntable. A pair of delivery chutes 70, 72 extend tangentially downwardly from diametrically opposed locations on tray 68. Each chute 70, 72 communicates at its upper end with an opening in the outer sidewall 68a of tray 68 and commumicates at its lower end with a work device positioned respectively on modular work station plates 32 and 38.

The invention transfer apparatus as disclosed is designed for use with an annular seal workpiece of the type seen at 74 in FIG. 6. Seal 74 includes an outer metallic ring 76, an inner elastomeric ring 78 and a circular garter spring 80. Elastomeric ring 78 includes a sealing lip portion 78a, a shoulder portion 78b, an annular groove 78c for receipt of garter spring 80, a sidewall portion 78d, and a dust lip portion 78e. Elastomeric ring 78 is bonded to metal ring 76 in a molding operation performed prior to delivery of the seal to the invention transfer apparatus. The workpiece delivered to workpiece delivery structure 51 for delivery down chutes 58, 60 comprises outer metal ring 76 with inner elastomeric ring 78 previously bonded thereto. Garter spring 80 is delivered to tray 68 for delivery down chutes 70–72 for assembly onto inner ring 78 as a part of the work performed on the seal as it is moved from work station to work station by the invention transfer apparatus.

A series of work devices are positioned at or on at least certain of modular work station plates 30–41. Two identical groups of identical work devices are associated with work stations 30–41 with each group positioned serially on one semi-circular portion of inner turntable assembly 12. One group of work devices comprises a loading device 82 associated with work station plate 30; a sensor 84 positioned on plate 30; a trimmer 86 positioned on plate 31; a springer 88 positioned on plate 32; a test device 90 positioned on plate 33; and an unloading device 92 positioned on plate 34. The other group of work devices comprises a loading device 94 associated with plate 36; a sensor 96 positioned on plate 36; a trimmer 98 positioned on plate 37; a springer 100 positioned on plate 38; a test device 102 positioned on plate 39; and an unloading device 104 positioned on plate 40. Work devices 82–92 will be described in detail. Work devices 94–104 are identical in all respects to work devices 82–94.

Loading device 82 comprises an air cylinder 106 suitably supported on a lower portion 58a of chute 58. Chute portion 58a extends radially outwardly in cantilever fashion over outer turntable assembly 14 so that cylinder 106 overlies the outer turntable assembly. Cylinder 106 includes a piston 108 and a loading head 110 carried at the free lower end of the piston. Head 110 has an annular lip 110a having a diameter less than that of seal outer ring 76 and greater than that of seal inner elastomeric ring 78.

Sensor 84 comprises an electromagnetic proximity sensor, of known construction, that functions to detect the presence or absence of a metal outer ring 76 and thereby provide an indication of the presence or absence of a seal on the outer turntable opposite the sensor.

Trimmer 86 is of known form and includes a knife blade 112 which may be linearly extended or retracted from trimmer housing 114 to trim off the flashing 78e (FIG. 5) remaining from the molding operation in which elastomeric ring 78 was formed and bonded to metal ring 76.

Springer 88 includes an arm 116, a head 118 carried on the radially outer end of arm 116, a raisable post 120 at the radially inner end of arm 116, and a paddle wheel 122 mounted for rotation on the axis of post 120. Paddle wheel 122 includes three arms 122a which coact successively with the lower end 70a of delivery spring chute 70 to pick up a garter spring 80 from chute 70 and transfer that spring to the lower end of head 118 in a rotary wiping operation whereafter post 120 is lowered to lower head 118 and assemble the spring to a seal positioned on outer turntable 14 opposite springer 88.

Tester 90 is of known form and includes and arm 124, a testing head 126 carried at the radially outer end of arm 126, and a raisable post 128 secured to the radially inner end of arm 124. Testing head 126 is lowered onto a seal positioned on outer turntable 14 opposite tester 90 and air is supplied in known manner to test the sealing capability of the seal.

Unloading device 92 includes a first unloading arm 128 and a second unloading arm 30, both extending radially outwardly over outer turntable 14. First unloading arm 128 houses an air jet nozzle 132 by which satisfactory seals, as determined by testing head 126, may be propelled radially outwardly on outer turntable 14 into contact with skirt 22 where they are maintained by centrifugal force until they are engaged by deflector 23 and unloaded radially outwardly through skirt opening 22a onto a discharge conveyor 133. Second unloading arm 130 houses an air jet nozzle (not shown) by which unsatisfactory seals may be propelled radially inwardly for downward discharge through an opening 34a in the top plate of module 34 from where they drop onto on underlying conveyor for transport to a reject area.

Outer carrier member or turntable assembly 14 includes a central hollow post 132, a support platform structure 134, a plurality of workpiece holder modules 136–159, and an outer annular apron 160.

Post 132 is telescoped over central post 26 of inner turntable 12 and journaled on that post by bearings 162 and 164. Additional bearings 166 journal post 132 in bearing support structure 24.

Support platform structure 134 includes a central hub member 168 suitably secured to the upper end of post 132; a plurality of spokes 170 secured in a circumferential array to hub member 168; a plurality of arcuate plates 172 secured to the radially outer ends of spokes 170 and coacting to define a continuous annular ring, and a plurality of circumferentially arranged bulkheads 174 secured to plates 172 by a plurality of T-section bracket members 176. In the disclosed embodiment, 24 equally spaced bulkheads 174 are employed and 24 spokes are employed with each spoke bisecting the space between the adjacent bulkheads so that the bulkheads and spokes each have 15° spacing and 7.5° separates a spoke from the next adjacent bulkhead.

Workpiece holder modules 136–159 are segmental or pie-shaped and are supported on plates 172 in a circumferential array encircling work station modules 30–41. Each workpiece holder module is positioned between a pair of spaced bulkheads 174 so that, in the disclosed embodiment, there are 24 workpiece holder modules. There are therefore two workpiece holder modules for each work station module and each workpiece holder module has a radial extent of 15°. All of the workpiece holder modules are identical.

Each workpiece holder module includes a candlestick member 178 supported on a plate 172 midway between adjacent bulkheads 174; a casting 180 supported on T-shaped bracket members 182 secured to the upper edges of the adjacent bulkheads 174; an electric motor 184 secured to the underside of casting 180 and having a central, hollow drive shaft 186 sealingly received at its lower end in the upper end of candlestick 178; a seal retainer asssembly 188 secured to the upper end of motor shaft 186 and including a resilient annular retainer ring 190; and a pie-shaped top plate 192 secured to casting 180 by spacers (not shown) and having a central circular opening 192a surrounding retainer member 190. Further details of the work holder modules are disclosed in applicant's copending U.S. patent application Ser. No. 634,604, filed July 26, 1984.

Control assembly 16 includes an inner turntable drive assembly 194, an outer turntable drive assembly 196, proximity switches 198 and 200, a prelocking pin assembly 202, a locking pin assembly 204, and a control circuit assembly 206.

Inner turntable drive assembly 194 includes an electric motor 208, a multi-groove drive pulley 210, a multi-groove belt 212, and a multi-groove driven pulley 214.

Motor 208 is an AC motor and is suitably mounted on housing base structure 20.

Drive pulley 210 is secured to the output shaft of motor 208 and driven pulley 214 is fixedly secured to central post 26 of inner turntable 12. Belt 212 trains around pulleys 210 and 214 so that inner turntable 12 is rotated in response to actuation of motor 208. The various hands are chosen so that turntable 12 rotates in a clockwise direction as viewed in FIG. 1.

Outer turntable drive assembly 196 includes an electric motor 216, a multi-groove pulley 218, a multi-groove belt 220, and a multi-groove driven pulley 222.

Motor 216 is an AC motor and is mounted on housing base structure 20. Drive pulley 218 is secured to the output shaft of motor 218 and driven pulley 222 is fixedly secured to central post 132 of outer turntable 14. Belt 220 trains around pulleys 218 and 222 so that outer turntable 14 is rotated, in a clockwise direction as viewed in FIG. 1, in response to actuation of motor 216.

Proximity switches 198 and 200, which may be of the radio frequency type, are secured to the underside of platform structure 28 for coaction with spokes 170. Switch 198 is positioned 7.5° from a bulkhead 29 and switch 200 is in alignment with that same bulkhead so that swtiches 198 and 200 are separated by 7.5° and one switch is centered over a spoke 170 when the other switch is midway between successive spokes 170.

Pre-locking pin assembly 202 includes a cylinder 224 and a plurality of stop members 226. Cylinder 224 is mounted on the outer edge of the trailing face of the bulkhead 29 beneath which proximity switch 200 is positioned and a stop member 226, in the form of a short strip of T-section bracket stock, is mounted on the inner edge of the trailing face of each bulkhead 174 in vertical alignment with cylinder 224. Cylinder 224 includes an extensible and retractable pin 228 which clears stop members 226 when retracted and stoppingly coacts with an associated stop member when extended. Cylinder 224 may, for example, comprise an electrically controlled, air actuated unit.

Locking pin assembly 204 includes a cylinder 230 and a plurality of brackets 232. Cylinder 230 is mounted on the outer edge of platform structure 28 in alignment with proximity switch 198 and a bracket 232 is mounted on the inner edge plate structure 72 midway between each pair of successive bulkheads 174. Cylinder 230 includes an extensible and retractable pin 234 which clears brackets 232 in its retracted position and is capable of entering a central aperture in the associated bracket 232 in its extended position. Cylinder 230 may, for example, comprise an electrically controlled, air actuated unit.

Control circuit assembly 206 includes an adjustable frequency drive controller 236 controlling the speed of motor 208; an adjustable frequency drive controller 238 controlling the speed of motor 216; a relay 240 connected to controller 236; a relay 242 connected to controller 238; a programmable controller 244 connected to relays 240 and 242; and another programmable controller 246 connected to controller 244.

Relay 240 controls three potentiometers 248, 250, and 252 respectively set to provide startup, sychronous, and acceleration speed signals to inner turntable motor 208.

Relay 242 controls three potentiometers 254, 256, and 258 respectively set to provide startup, synchronous, and deceleration speed signals to outer turntable motor 216.

Programmable controller 244 may, for example, comprise a Gould Modicon Micro 84 Controller available from Gould Incorporated of Rolling Meadows, Illinois.

Motors 208 and 216, frequency controllers 236 and 238, relays 240 and 242, and programmable controller 244 and are suitably mounted on frame assembly 10.

Programmable controller 246, which may be identical to controller 244, is mounted on platform structure 28 and is connected to controller 244 through a slip ring arrangement shown at 260. Controller 246 is connected to proximity switch 198, proximity switch 200, pre-locking cylinder 224, and locking cylinder 230. Controller 246 also includes a plurality of output terminals 262 for respective connection with work devices 82–104.

Operation

For purposes of description, it is assumed that the two turntables are rotating at synchronous speeds, as determined by the synchronous set points established by potentiometers 250 and 256; that a seal 74 is present in the retainer ring 190 of each workpiece holder module; that locking pin 234 is lockingly inserted in one of the associated brackets 232; that pre-locking pin 228 is retracted; and that the various work devices positioned on or associated with the various work station modules have just completed their various work or assembly operations. At this time the following operations occur to effect a transfer of a seal from one work station to the next work station:

1. Controller 244 instructs controller 246 to instruct cylinder 230 to withdraw pin 234 and simultaneously instructs relay 240 to switch to potentiometer setting 252 to send an acceleration signal to inner turntable motor 208 and instructs relay 242 to switch to potentiometer setting 258 to send a deceleration signal to outer turntable motor 216.
2. The outer turntable thus slows down and the inner turntable speeds up so that the outer turntable, in effect, drops back relative to the inner turntable.
3. After the inner and outer turntable have undergone 7.5° of relative rotation indicative that the work modules have reached the halfway point in their movement from one work station to the next, proximity switch 200 senses the passage of a spoke 170. This signal is picked up by controller 246 which thereupon instructs cylinder 224 to extend its pin 228 into the path of the stop 226 on the approaching bulkhead 174 and instructs controller 244 to switch relays 240 and 242 to potentiometer synchronous settings 250 and 256.
4. The outer turntable thus speeds up as the motor 216 speeds up to achieve its synchronous speed setting and the inner turntable thus slows down as motor 208 slows down to achieve its synchronous speed setting.
5. After the inner and outer turntables have undergone another 7.5° of relative rotation, providing a cumulative total of 15° of relative rotation and indicating that the transfer of the seal between successive work stations has been completed, pre-locking pin 228 engages stop 226 and proximity switch 198 senses the arrival of a spoke 170 and signals controller 246 to instruct locking cylinder 230 to extend pin 234 into locking coaction with the associated bracket 232 whereupon controller 246 signals cylinder 224 to retract pin 228 and instructs the various work devices to perform their various work or assembly operations on the newly arrived seals. Specifically, with respect to work devices 82–92:
   (a) loading device 82 is instructed to release its magnetic hold on the outer metal ring 76 of the seal 74 positioned in chute 58 directly beneath cylinder 106 and cylinder 106 is instructed to lower its piston 108 to pilot loading head lip 110a into the annular space between metal outer ring 76 and elastomeric inner ring 78 and enable loading head 110 to engage metal ring 76 and load the seal downwardly and frictionally into the resilient retainer ring 190 of the underlying workpiece holder module;
   (b) sensor 84 is instructed to sense the presence or absence of a metal outer ring and thereby provide an indication of the presence or absence of a seal in the retainer ring opposite the sensor;
   (c) trimmer 88 is instructed to extend its knife blade 112 and the motor 184 of the associated workpiece holder is actuated to spin the seal retained in the associated retainer ring 90, whereby to trim off the flashing 78e remaining from the molding operation;
   (d) springer 88 is instructed to incrementally rotate arm 116 to move a paddlewheel arm 122a beneath springer head 118 and wipingly transfer a garter spring 80 carried on the paddlewheel arm to the underside of head 1118 whereafter post 120 is lowered to move head 118 downwardly into a position directly overlying the associated retainer ring 190, whereafter stripper ring 264 is actuated to strip garter spring 80 from head 118 and move it downwardly over the shoulder 78b of the inner elastomeric ring 78 of the seal 74 frictionally retained in retainer ring 190 for snapping insertion into annular groove 78c;
   (e) tester 90 is instructed to move testing head 126 downwardly to a position directly overlying the seal frictionally retained in the associated retainer ring 190, whereafter air is supplied in known manner to test the sealing capability of the seal; and
   (f) with respect to unloading device 192, as the workpiece holder module holding the seal that has just undergone testing by tester 90 leaves tester 90 and moves toward unloading device 92, the seal is raised upwardly out of retainer 190 to a position where it can be propelled outwardly by jet nozzle 132, if tester 90 has indicated that the seal is satisfactory, or propelled inwardly by the jet nozzle carried by arm 130, if tester 90 has indicated that the seal is unsatisfactory.
6. After the work and assembly operations have been performed at the various work stations, the above cycle is repeated.

As seen in FIG. 8, the entire transfer operation between successive work station can be successfully accomplished in a fraction of the time required to actually perform the various work operations. For example, whereas it is necessary to allow approximately one second to perform the various work operations, the invention transfer apparatus is capable of effecting the transfer of seals between work stations in approximately two-tenths of a second with half of that time consumed by acceleration of the inner turntable and deceleration of the outer turntable and the other half of that time consumed by deceleration of the inner turntable and acceleration of the outer turntable. This transfer time is significantly faster than that provided by prior art transfer devices operating in a similar environment. Note that the acceleration portion of each curve of FIG. 8 is substantially symmetrical to the deceleration portion of that curve so that the turntables represented by the curves each return to their synchronous speed substantially at the time that the workpiece holder arrives at the new work station.

Whereas a preferred embodiment of the invention has been illustrated and described in detail, it will be apparent that various changes may be made in the preferred embodiment without departing from the scope or spirit of the invention.

I claim:

1. A method of advancing a workpiece through a series of successive work stations for successive work operations by work devices positioned at the work stations, said method comprising the steps of:
   A. defining a series of successive work stations on a first carrier member;
   B. mounting work devices, in series, on said first carrier member at at least some of said work stations;
   C. moving said first carrier member at a given rate of speed in a given direction along a predetermined path;
   D. placing the workpiece on a second carrier member;

E. moving said second carrier member at said given rate of speed and in said given direction along a path generally parallelling said predetermined path; and F. selectively varying the relative speeds of said carrier members to advance the workpiece successively through said work stations for successive work operations by work devices positioned at said work stations.

2. The method of claim 1 wherein:

G. said selectively varying step comprises, for each advance of the workpiece from one work station to the next work station,
1. accelerating one of said carrier members while decelerating the other of said carrier members until said workpiece is at a predetermined position intermediate a previous work station and a new work station, and
2. thereafter decelerating said one carrier member while accelerating said other carrier member.

3. The method of claim 2 wherein the work operation performed by at least certain of said work devices comprises an assembly operation whereby a further part is added to the workpiece.

4. The method of claim 2 wherein the work operation performed by at least certain of said work devices comprises work done to modify the workpiece.

5. The method of claim 2 wherein:

H. said paths comprise concentric circular paths.

6. The method of claim 5 wherein:

I. the circular path of said first carrier member is concentrically within the circular path of said second carrier member.

7. The method of claim 6 wherein:

J. said one carrier member is said first carrier member and said other carrier member is said second carrier member.

8. The method of claim 2 wherein:

H. said one carrier member is decelerated to said predetermined speed and said other carrier member is accelerated to said predetermined speed substantially coincident with the arrival of said workpiece at said new work station.

9. The method of claim 2 wherein:

H. said intermediate position is halfway between said previous work station and said new work station; and I. the acceleration curve of each of said carrier members is substantially symmetrical to the deceleration curve of that member so that each of said members returns to said predetermined rate of speed as said workpiece arrives at said new work station.

10. An apparatus for advancing a workpiece through a series of successive work stations for successive work operations by work devices positioned at the work stations, said apparatus comprising:

A. a first carrier member mounted for movement along a predetermined path;

B. means defining a series of successive work stations on said first carrier member;

C. a series of work devices mounted on said first carrier member at at least some of said work stations;

D. a second carrier member mounted for movement along a path generally paralleling said predetermined path;

E. a series of workpiece holder devices mounted on said second carrier member at spaced locations therealong; and F. control means operative to drive said carrier members in a given direction along said paths and to selectively vary the relative speeds of said carrier members to selectively advance each of said workpiece holder devices successively through said work stations.

11. An apparatus according to claim 10 wherein at least certain of said work devices comprise assembly devices operative to assembly further parts to the workpiece.

12. An apparatus according to claim 10 wherein at least certain of said work devices are operative to modify the workpiece.

13. An apparatus according to claim 10 wherein:

G. said control means comprises
1. means operative in response to arrival of one workpiece holder at one work station to drive both of said carrier members at a single predetermined speed;
2. means operative, following passage of a predetermined dwell time with said one workpiece holder positioned at said one work station, to accelerate one of said carrier members and decelerate the other carrier member;
3. means operative upon arrival of said one workpiece holder at a predetermined position intermediate said one work station and the next successive work station to decelerate said one carrier member and accelerate said other carrier member; and
4. means operative upon arrival of said one workpiece holder at said next work station to again drive said carrier members at said single predetermined speed.

14. An apparatus according to claim 13 wherein said control means includes:

H. proximity switches sensing the relative positions of said first and second carrier members; and I. first and second drive means for said first and second carrier members selectively actuated by said proximity switches.

15. An apparatus according to claim 14 wherein:

J. each of said drive means includes an electric motor; and

K. said proximity switches comprise sensors carried by said first carrier member and coacting with positional indicia provided by said second carrier member.

16. An apparatus according to claim 13 wherein:

H. said first and second carrier members comprises concentric turntables mounted for rotation about a common central axis.

17. An apparatus according to claim 16 wherein:

I. said first carrier member comprises the inner turntable and said second carrier member comprises the outer turntable.

18. An apparatus according to claim 17 wherein:

J. said workpiece holders are configured to handle seals having a generally circular configuration; and K. said work devices comprise
1. a seal loading device,
2. a seal trimming device,
3. a garter spring assembly device, and
4. a seal unloading device.

19. An apparatus according to claim 17 wherein:

J. said apparatus further includes a loading chute mounted on said inner turntable and having its upper end positioned adjacent said common central axis and its lower end positioned adjacent said outer turntable; and K. one of said work devices comprises a loading device positioned to coact with the lower end of said chute to successively deliver workpieces to successive work holders on said outer turntable.

20. An apparatus according to claim 19 wherein:

L. the lower end of said chute extends radially outwardly over said outer turntable; and M. said loading device is mounted on the lower end of said chute in a position overlying said outer turntable.

21. An apparatus according to claim 17 wherein:

J. one of said work devices comprises a testing device and

K. the last work device in said series of work devices comprises an unloading device operative in response to signals from said testing device to unload satisfactory workpieces from said turntable in a first direction and unload unsatisfactory workpieces from said turntable in a second direction.

22. An apparatus according to claim 21 wherein:

L. said unloading device unloads satisfactory workpieces in a radially outer direction and unloads unsatisfactory workpieces in a radially inner direction.

23. An apparatus according to claim 22 wherein:

M. said apparatus includes means defining an annular vertical wall at the outer perimeter of said outer turntable;

N. said unloading device functions to eject satisfactory workpieces radially outwardly into contact with said vertical wall;

O. said turntables are spun at a speed sufficient to maintain said satisfactory workpieces against said vertical wall by centrifugal force; and P. said apparatus further includes a fixed deflector member angled radially inwardly over the radially outer portion of said outer turntable at an opening in said vertical wall and operative to engage and unload workpieces radially outwardly through said opening as they are carried to the deflector by the rotation of the turntables.

24. An apparatus according to claim 23 wherein:

Q. said apparatus further includes a conveyor having one end positioned at said opening to receive and carry away workpieces unloaded through said opening by said deflector.

25. An apparatus according to claim 22 wherein the unsatisfactory workpieces, as they are unloaded radially inwardly, drop through an opening in said inner turntable where they are received by an underlying conveyor for transport to a reject area.

26. An apparatus according to claim 17 wherein:

J. one of said work devices is an assembly device adapted to assemble an additional part to said workpiece and K. another loading chute is mounted on said inner turntable and coacts at its lower end to deliver said additional part to said assembly device for assembly onto said workpiece.

27. An apparatus according to claim 26 wherein

L. said workpiece holders are configured to handle seals having a generally circular configuration;

M. said additional part is a garter spring; and

N. said assembly device functions to receive a garter spring from said other loading chute and assemble the spring to the circular seal to form a seal assembly.

* * * * *